United States Patent

Mazewski et al.

[11] Patent Number: 5,552,052
[45] Date of Patent: Sep. 3, 1996

[54] METHOD OF REDUCING IRON FOULING IN GROUNDWATER TREATMENT SYSTEMS

[75] Inventors: Eugene E. Mazewski, Pewaukee; Robert D. Hines, Jr., Kenosha, both of Wis.

[73] Assignee: Envirex Inc., Waukesha, Wis.

[21] Appl. No.: 353,196

[22] Filed: Dec. 9, 1994

Related U.S. Application Data

[62] Division of Ser. No. 13,941, Feb. 4, 1993, abandoned.

[51] Int. Cl.$^6$ ............................ C02F 3/08; C02F 1/64
[52] U.S. Cl. .................. 210/617; 210/621; 210/631; 210/722; 210/759
[58] Field of Search ............................ 210/722, 758, 210/150, 151, 205, 206, 616, 617, 620, 621, 622, 626, 629, 631, 759, 627, 747

[56] References Cited

U.S. PATENT DOCUMENTS

| | | | |
|---|---|---|---|
| 1,139,024 | 5/1915 | Frank. | |
| 2,786,801 | 3/1957 | McKinley et al. | 196/53 |
| 3,643,403 | 2/1972 | Speece | 55/53 |
| 3,804,255 | 4/1974 | Speece | 210/194 |
| 3,846,289 | 11/1974 | Jeris et al. | 210/8 |
| 3,926,588 | 12/1975 | Speece | 55/52 |
| 3,956,129 | 5/1976 | Jeris et al. | 210/189 |
| 4,009,098 | 2/1977 | Jeris | 210/3 |
| 4,009,105 | 2/1977 | Jeris | 210/107 |
| 4,177,144 | 12/1979 | Hickey et al. | 210/86 |
| 4,182,675 | 1/1980 | Jeris | 210/8 |
| 4,202,774 | 5/1980 | Kos | 210/274 |
| 4,246,111 | 1/1981 | Savard et al. | 210/96.1 |
| 4,250,033 | 2/1981 | Hickey et al. | 210/106 |
| 4,322,299 | 3/1982 | Scholtes et al. | 210/794 |
| 4,412,924 | 1/1983 | Feather | 210/744 |
| 4,451,361 | 5/1984 | Paterson | 210/205 |
| 4,464,262 | 8/1984 | Owens et al. | 210/291 |
| 4,466,928 | 8/1984 | Kos | 261/76 |
| 4,469,959 | 9/1984 | Gros et al. | 210/610 |
| 4,507,253 | 3/1985 | Wiesmann | 261/22 |
| 4,582,600 | 4/1986 | Atkinson et al. | 210/205 |
| 4,800,021 | 1/1989 | Desbos | 210/605 |
| 4,961,854 | 10/1990 | Wittmann et al. | 210/621 |
| 4,966,692 | 10/1990 | Overy | 210/205 |
| 5,096,580 | 3/1992 | Auchincloss | 210/722 |
| 5,096,596 | 3/1992 | Hellenbrand et al. | 210/722 |
| 5,228,997 | 7/1993 | Martin et al. | 210/617 |

FOREIGN PATENT DOCUMENTS 0134271  3/1985  European Pat. Off..

*Primary Examiner*—Thomas G. Wyse
*Attorney, Agent, or Firm*—Michael, Best & Friedrich

[57] ABSTRACT

Disclosed herein is a treatment facility comprising a fluid bed reactor including a reactor tank containing a bed of particles which function as a carrier for growth of biological material, the reactor tank having an inlet and an outlet, the reactor further including structure for conducting liquid to be treated, from the reactor tank inlet, upwardly through the bed of particles at a rate conducive to fluidization of the bed of particles; an equalization surge tank for housing liquid to be treated in the fluid bed reactor, the equalization surge tank having an inlet, and an outlet; conduit structure for supplying liquid from the outlet of the equalization surge tank to the inlet of the fluid bed reactor; and structure for supplying an oxidant into the equalization surge tank, in such a manner that stripping of volatile constituents is avoided, for oxidizing iron in the liquid in the equalization surge tank.

7 Claims, 3 Drawing Sheets

METHOD OF REDUCING IRON FOULING IN GROUNDWATER TREATMENT SYSTEMS

This is a division of application Ser. No. 08/013,941 filed Feb. 4, 1993, entitled "METHOD OF AND APPARATUS FOR REDUCING IRON FOULING IN GROUNDWATER TREATMENT SYSTEMS", now abandoned.

FIELD OF THE INVENTION

The invention relates generally to groundwater and wastewater (or water and wastewater) treatment facilities and, more particularly, to such treatment facilities employing fluid bed reactors.

BACKGROUND OF THE INVENTION

It is known to employ fluid bed reactors in wastewater treatment facilities. A liquid to be treated, such as wastewater or water polluted with volatile organic constituents, is conducted upwardly through a bed of particles, such as granular activated carbon, contained in a fluid bed reactor. The liquid is conducted through the bed of particles at a rate sufficient to cause fluidization of the bed. The particles serve as carriers for growth of biological material that is provided in the bed of particles and that acts on the liquid.

For example, the biological material can be bacteria in the form of denitrifying biota which denitrifies wastewater. Alternatively, the biological material can be microorganisms that consume volatile constituents in the liquid. In this case, the microorganisms either immediately consume the volatile constituents, or the volatile constituents are absorbed by the particles until they can be consumed by the microorganisms.

The biological material grows and causes the bed to expand. Means are provided for removing excess biological growth.

Attention is directed to the following references which relate to fluid bed reactors and which are incorporated herein by reference:

| U.S. Pat. No. | Inventor(s) | Issue Date |
|---|---|---|
| 4,961,854 | Wittmann et al. | October 9, 1990 |
| 4,800,021 | Desbos | January 24, 1989 |
| 4,469,599 | Gros et al. | September 4, 1984 |
| 4,464,262 | Owens et al. | August 7, 1984 |
| 4,322,299 | Scholten et al. | March 30, 1982 |
| 4,250,033 | Hickey et al. | February 10, 1981 |
| 4,202,774 | Kos | May 13, 1980 |
| 4,182,675 | Jeris | January 8, 1980 |
| 4,177,144 | Hickey et al. | December 4, 1979 |
| 4,009,105 | Jeris | February 22, 1977 |
| 4,009,098 | Jeris | February 22, 1977 |
| 3,956,129 | Jeris et al. | May 11, 1976 |
| 3,846,289 | J. S. Jeris et al. | June 19, 1972 |
| 2,786,801 | J. B. McKinley et al. | March 26, 1957 |
| 1,139,024 | Leslie C. Frank | May 11, 1915 |

Attention is also directed to Japanese Kokai Patent No. Sho 57(1982)-122997, Shimodaira et al.

Liquid to be treated can be supplied to the fluid bed reactor via an equalization surge tank, which accommodates changes in flow rate and concentration of influent, which supplies liquid to the fluid bed reactor at a constant rate, and which optionally includes a stirring or mixing device.

In wastewater treatment facilities of the type including a fluid bed reactor, it is desirable to control iron fouling caused by the presence of ferrous iron in the liquid being treated, and caused by the presence of iron metabolizing bacteria, in the fluid bed reactor. Previously, iron fouling has been allowed to occur until there is an interference in the operation of the treatment facility—e.g., high pressure drops, maldistribution of water at the bottom of the fluid bed reactor, or a poorly fluidized bed. Iron metabolizing bacteria are a major contributing factor in iron fouling. It is desirable to reduce iron fouling without producing gaseous emissions containing stripped volatile organic constituents.

A similar problem exists when attempting to clean an underground storage tank area by pumping groundwater into the area and then conveying water from the area to a fluid bed reactor for treatment. The groundwater which is pumped into the area might be high in iron content, and might cause fouling of the fluid bed reactor.

Prior methods for removing iron from waste water, in an effort to reduce iron fouling, have included ion exchange, addition of sequestrants, aeration towers, or use of iron filters. These methods are more complex and more expensive than the method employing the invention disclosed herein. Further, these methods may create iron sludge which must be disposed, and these methods are potentially hazardous if the iron is removed upstream of the treatment process that employs the fluid bed reactor, particularly if volatile components are being carried by the wastewater.

Devices for dissolving gas in liquid are known. Attention is directed to the following references which are incorporated herein by reference:

| U.S. Pat. No. | Inventor(s) | Issue Date |
|---|---|---|
| 4,507,253 | Wiesmann | March 26, 1985 |
| 4,466,928 | Kos | August 21, 1984 |
| 4,412,924 | Feather | November 1, 1983 |
| 4,246,111 | Savard et al. | January 20, 1981 |
| 3,926,588 | Speece | December 16, 1975 |
| 3,804,255 | Speece | April 16, 1974 |
| 3,643,403 | Speece | February 22, 1972 |

None of the above references relating to dissolving gas in liquid teach or suggest a method of reducing iron fouling in a water treatment facility of the type employing a fluid bed reactor. Attention is also directed to copending U.S. patent application Ser. No. 07/972,742 which is assigned to the assignee of the present application and which is incorporated herein by reference.

SUMMARY OF THE INVENTION

The invention provides a method and apparatus for reducing iron fouling in a water treatment facility of the type that includes a fluid bed reactor.

Iron in the liquid to be treated is converted to a form which is less prone to adhering to surfaces or which cannot be metabolized by iron metabolizing bacteria before introduction into the fluid bed reactor. The form of the iron is inexpensively changed in form, by oxidation, from ferrous (which can be used as food by iron metabolizing bacteria) to ferric (which is less available as food by iron metabolizing bacteria). The iron in ferric form does not foul the fluid bed reactor and can be left in the liquid that is to be treated, for discharge after treatment. The iron in ferric form can usually be discharged because it is not a pollutant. Iron fouling due to bacteria is substantially eliminated.

In one aspect of the invention, to oxidize the iron, a liquid carrying an oxidant is introduced into an equalization surge tank upstream of the fluid bed reactor.

In another aspect of the invention, a chemical, such as hydrogen peroxide, is introduced into the equalization surge tank which reacts with liquid, in the equalization surge tank, that is to be treated, to produce oxidant dissolved in the liquid in the equalization surge tank.

In another aspect of the invention, a solid oxidant is introduced into the equalization surge tank.

Other features and advantages of the invention will become apparent to those of ordinary skill in the art upon review of the following detailed description, claims, and drawings.

DETAILED DESCRIPTION OF THE PREFERRED EMBODIMENT OF THE INVENTION

Figure 1:
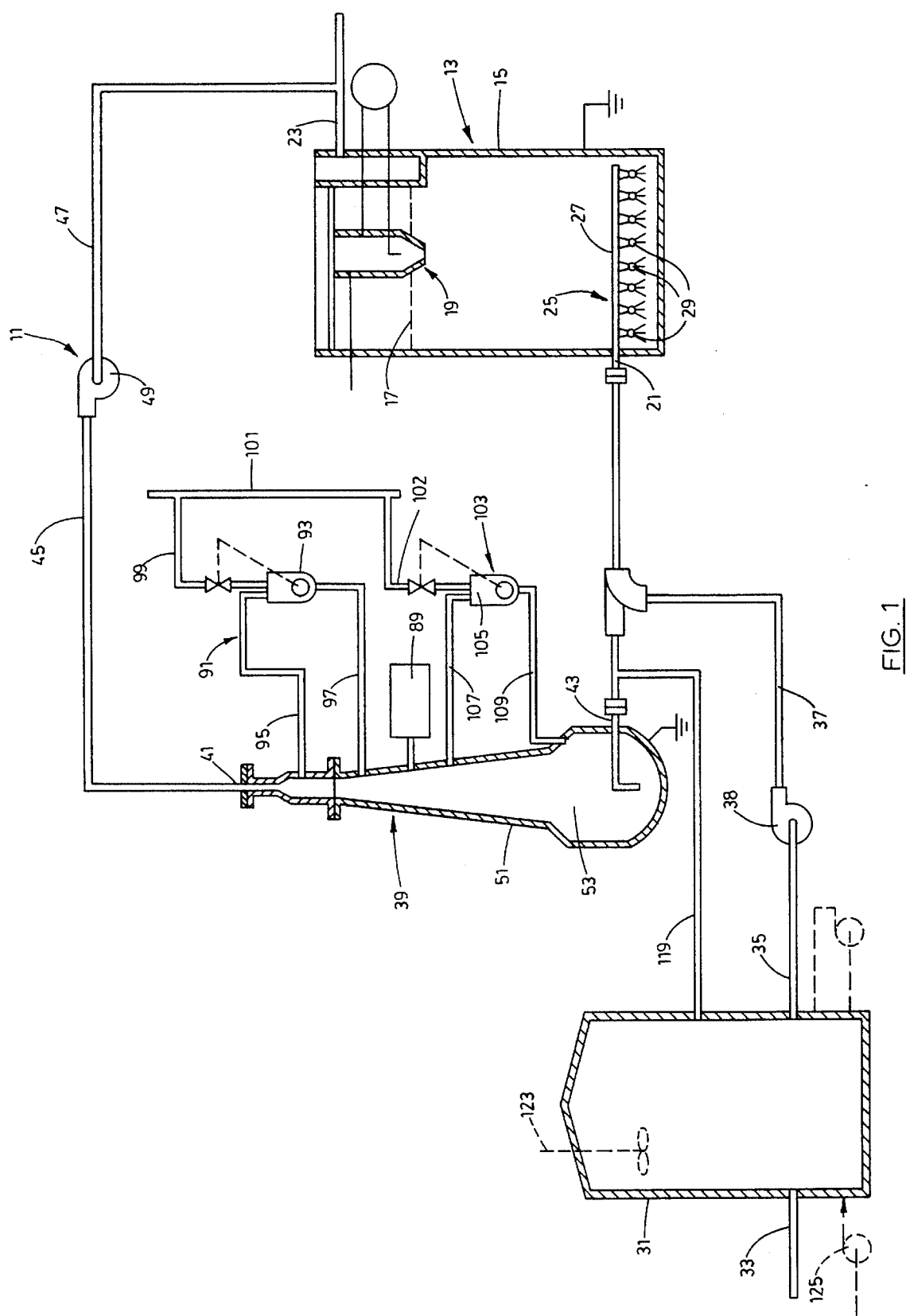
FIG. 1 is a schematic view, partially in section, of a liquid treatment facility embodying the invention.

Shown in the various figures is a treatment facility 11 which is capable of treating liquid which may comprise volatile constituents. For example, the treatment facility can be used to remove potentially combustible contaminants including fuel constituents from groundwater tainted by sources such as refineries, leaking underground fuel storage tanks, and the like. The fuel constituents can include, for example, benzene, toluene, ethylbenzene, xylene (BTEXs), and other hydrocarbon compounds. The treatment facility 11 can be mobile, carried for example in a semi trailer, or can be fixed at a particular location. The treatment facility 11 can be variously sized, depending on capacity requirements, and can be used alone or in series or parallel with identical or different treatment apparatus.

The facility 11 includes a conventional fluid bed reactor 13 including a reactor tank 15 containing a bed 17 of particulate solids, preferably granular activated carbon or sand, and containing microorganisms carried on the particulate solids. Cellular growth results from the microorganisms treating wastewater that enters the reactor tank 15. To remove excessive cellular growth, the fluid bed reactor 13 includes an excess growth control system 19. Examples of suitable excess growth control systems are provided in U.S. Pat. No. 4,177,144, issued to Hickey et al. on Dec. 4, 1979; and U.S. Pat. No. 4,250,033, issued to Hickey on Feb. 10, 1981. The reactor tank 15 has an inlet 21 and an outlet 23. The fluid bed reactor further includes means for conducting liquid to be treated, from the reactor tank inlet 21, upwardly through the bed of particles at a rate conducive to fluidization of the bed of particles. In the illustrated embodiment, this means comprises a flow distributor 25 at the base of the reactor tank 15. The flow distributor 25 comprises a header member 27 in fluid communication with the inlet 21, and a plurality of spaced apart nozzles 29 in fluid communication with the header member 27. The header member 27 is manifolded to the nozzles 29 such that the nozzles conduct liquid to be treated into the reactor tank 15.

The treatment facility 11 further includes an equalization surge tank 31 for housing liquid to be treated in the fluid bed reactor 13. The equalization surge tank 31 has an inlet 33 and an outlet 35. The equalization surge tank 31 accommodates for varying flow rates entering via the inlet 33 by providing a storage area for varying volumes of liquid. Liquid can be conducted from the equalization surge tank 31 to the fluid bed reactor at a constant flow rate.

The treatment facility 11 further includes a conduit 37 and pump 38 for supplying liquid from the outlet 35 of the equalization surge tank 31 to the inlet 21 of the fluid bed reactor 13.

The treatment facility 11 further includes an oxygenator 39 for providing dissolved oxygen to the liquid in the conduit 37, upstream of the fluid bed reactor 13. Such an oxygenator is disclosed in detail in copending U.S. patent application Ser. No. 07/972,742, filed Nov. 6, 1992, which is assigned to the assignee of the present invention and which is incorporated herein by reference. The dissolved oxygen is provided to support biological action in the fluid bed reactor 13. The oxygenator 39 has an inlet 41 and an outlet 43. While various sources of liquid could be supplied to the oxygenator 39, in the illustrated embodiment, a portion of the treated liquid from the outlet 23 of the fluid bed reactor 13 is supplied to the oxygenator 39 from the fluid bed reactor 13. In this regard, the treatment facility 11 further includes a recycle conduit 45 in fluid communication with the inlet 41 of the oxygenator, a conduit 47 in fluid communication with the outlet 23 of the fluid bed reactor 13, and a pump 49 connected between the conduits 47 and 45.

Figure 2:
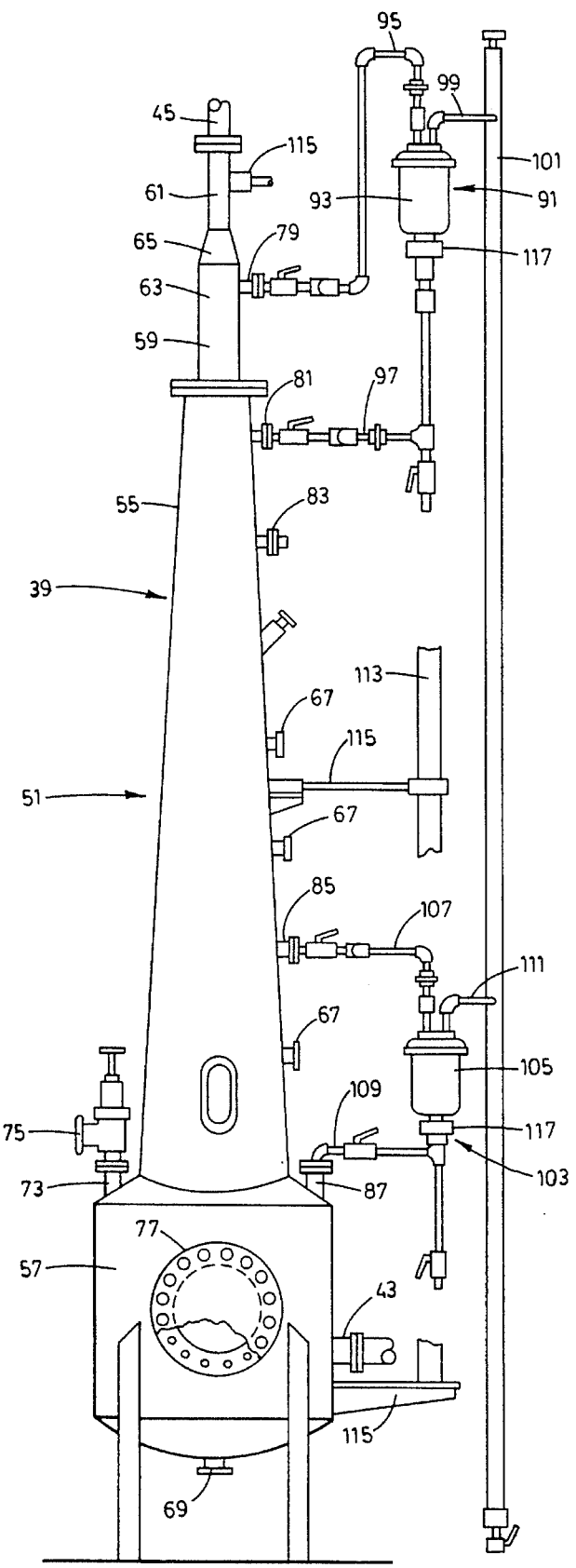
FIG. 2 is a partially cut away, enlarged elevational view showing an oxygenator included in the treatment facility shown in FIG. 1.
Figure 3:
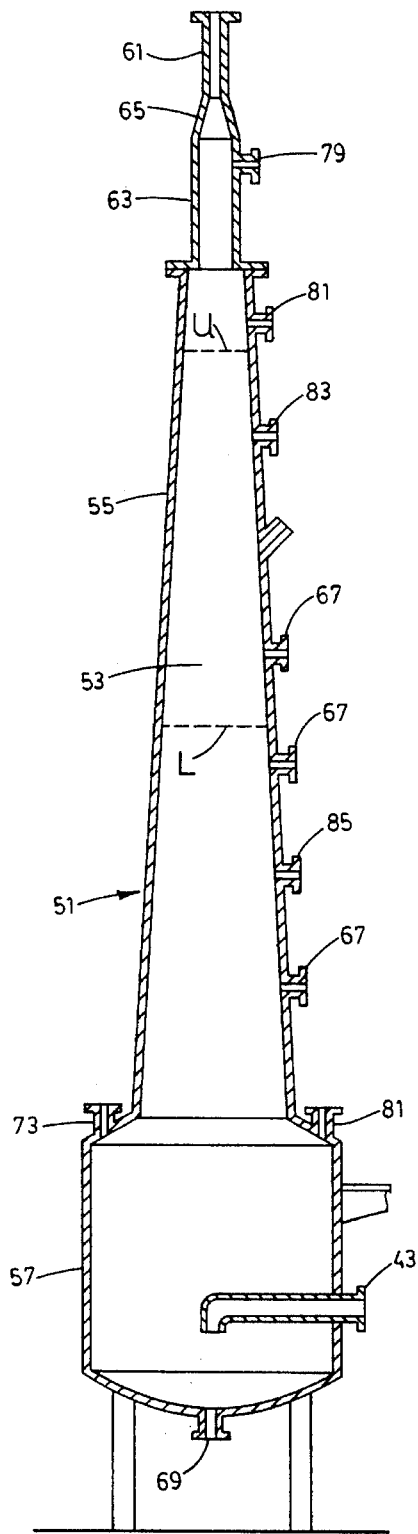
FIG. 3 is a cross-sectional view of the oxygenator illustrated in FIG. 2.

The oxygenator 39 includes a mixing vessel or bubble contactor 51 defining a gas/liquid or bubble contact chamber 53 (FIG. 3). As shown in FIG. 2, the bubble contactor 51 includes a frustoconically-shaped section 55 which diverges downwardly into an enlarged lower section 57. The bubble contactor 51 also includes a tubular transition member 59 connected between the upper end of the section 55 and the recycle conduit 45. In a preferred form of the invention the tubular transition member 59 includes an upper end 61 connected to the recycle conduit 45 and having a diameter which is the same as conduit 45. Tubular transition member 59 further includes a lower portion 63 connected to the upper end of the frustoconically shaped section 55 and having an inside diameter smaller than the inside diameter of the upper end of the frustoconically shaped section 55 and larger than the inside diameter of the recycle conduit 45. The upper end 61 and lower portion 63 are joined by a conical section 65 of the transition member 59. The velocity of liquid flowing into the bubble contactor from the recycle conduit 45 will be reduced as the liquid enters the transition member 59 and will be reduced again as it flows into the upper end of the frustoconically shaped section. By providing the tubular transition member 59, the length of the frustoconically shaped section can be reduced.

To permit various maintenance, monitoring and control operations, the bubble contactor 51 is provided with a plurality of ports. These ports include monitoring ports 67 through which water samples can be withdrawn via valves (not shown) connected to the ports 67, a water fill port 69, a relief port 73 on which a relief valve 75 is mounted, and a manhole port 77. For reasons more fully explained below, additional ports 79, 81, 83, 85 and 87 are also provided.

The oxygenator 39 also includes a gas source 89 (FIG. 1) connected to the port 83 to provide oxygen enriched gas under pressure to the contact chamber 53.

To increase the dissolved oxygen content of the treated effluent entering the conduit 37, the pump 49 is utilized for pressurizing the bubble contactor 51.

The treatment facility 11 is also provided with an upper vent assembly 91 for venting gas from the bubble contactor

51. The upper vent assembly 91 is operable to periodically vent gas from the upper part of the contact chamber 53 if a gas space of appreciable size develops. The upper vent assembly 91 remains closed at all other times to minimize the loss of undissolved oxygen. Such a gas space could result, for example, from the accumulation and coalescence of gas bubbles originating from gases such as nitrogen that are stripped from the treated effluent during the oxygenation process. By venting the bubble contactor 51 when a gas space develops the formation of a mixture of undissolved oxygen and gasoline constituents sufficient to present even a minimal risk of combustion within the bubble contactor 51 is reduced. The bubble contactor 51 and the fluid bed reactor 13 are electrically grounded.

As shown in FIG. 2, the upper vent assembly 91 includes an air release valve 93 that is preferably a float-operated valve, such as is produced by Val-Matic Valve and Manufacturing Corp., Elmhurst, Ill. The upper vent assembly 91 also includes conduits 95 and 97 connecting the upper and lower parts of the valve 93 to the ports 79 and 81, respectively, and a conduit 99 connecting the valve 93 to a vent conduit 101. When a gas space of sufficient size to overcome the downflow velocity and turbulence within the contact chamber 53 rises to the upper part of the contact chamber 53, the valve 93 will open to vent the gas space through the vent conduit 101.

While the operation of the tubular transition section 59 is not fully understood, in operation, it appears that in the event bubbles begin to coalesce in the bubble contactor, a free gas space tends to form in the top of the tubular transition section member 59 thereby triggering venting of gas from the bubble contactor through the upper vent assembly 91, and the efficient operation of the bubble contactor can then continue.

The treatment facility 11 is also provided with a lower vent assembly 103 for venting gas from the bubble contactor 51. The lower vent assembly 103 includes an air release valve 105 preferably identical to the valve 93. The lower vent assembly 103 also includes conduits 107 and 109 connecting the upper and lower parts of the valve 105 to the ports 85 and 87, respectively, and a conduit 111 connecting the valve 105 to the vent conduit 101. Like the upper valve 93, the lower valve 105 opens to vent the system only when a concentration of undissolved gas bubbles sufficient to actuate the float mechanism in the valve 105 is present in the lower part of the bubble contactor 51. The valve 105 remains closed at other times. By preventing the escape of gas bubbles from the bubble contactor 51, these bubbles are prevented from reaching the reactor 13 where they can degrade reactor performance.

A vertical channel 113 and a plurality of support members 115 supporting the channel 113 on the bubble contactor 51 are provided to support the upper and lower vent assemblies 91 and 103. Brackets 117 are provided to mount the valves 93 and 105 on the channel 113.

The treatment facility 11 further includes means for supplying a liquid carrying an oxidant into the equalization surge tank 31 in a quantity sufficient to oxidize iron in the liquid in the equalization surge tank 31. The quantity of oxidant required is calculated by taking a sample of the liquid entering the equalization surge tank 31, determining how much iron is present in the sample, and calculating, using stoichiometry, the amount of oxidant required to oxidize the iron. Preferably, more oxidant is supplied to the equalization surge tank 31 than is required to oxidize the iron in the liquid in the equalization surge tank 31. For example, in one embodiment of the invention, somewhere between 1.5 and 3 times the calculated amount of oxidant required is supplied to the equalization surge tank 31.

In one embodiment of the invention (see FIG. 1), the means for supplying a liquid carrying an oxidant includes the oxygenator 39. More particularly, in this embodiment of the invention, the treatment facility 11 further includes a conduit 119 in fluid communication between the outlet 43 of the oxygenator 39 and the equalization surge tank 31 for supplying liquid carrying dissolved oxygen to the equalization surge tank 31. This liquid will be relatively free of volatile constituents because the liquid introduced into the oxygenator 39 has already been treated by the fluid bed reactor 13. In the illustrated embodiment, the treatment facility 11 includes the capacity to provide 30 gallons per minute of liquid from the outlet 43 of the oxygenator 39 to the equalization surge tank 31 via the conduit 119, and the equalization surge tank 31 has the capacity of receiving 150 gallons per minute of liquid from the inlet 33.

In an alternative embodiment of the invention (see FIG. 4), means are provided for introducing into the equalization surge tank 31 a chemical which reacts with liquid in the equalization surge tank 31 to produce oxygen dissolved in the liquid in the equalization surge tank 31. This chemical could be in liquid, or solid form. In the embodiment illustrated in FIG. 4, a supply 121 of a chemical oxidant is provided in fluid communication with the equalization surge tank 31 for supplying the chemical oxidant into the equalization surge tank 31. Chemical oxidants that can be employed include, for example, hydrogen peroxide, chlorine, hypochlorite, ozone, potassium permanganate, or manganese dioxide. Other chemical oxidants will be apparent to one skilled in the art.

Figure 4:
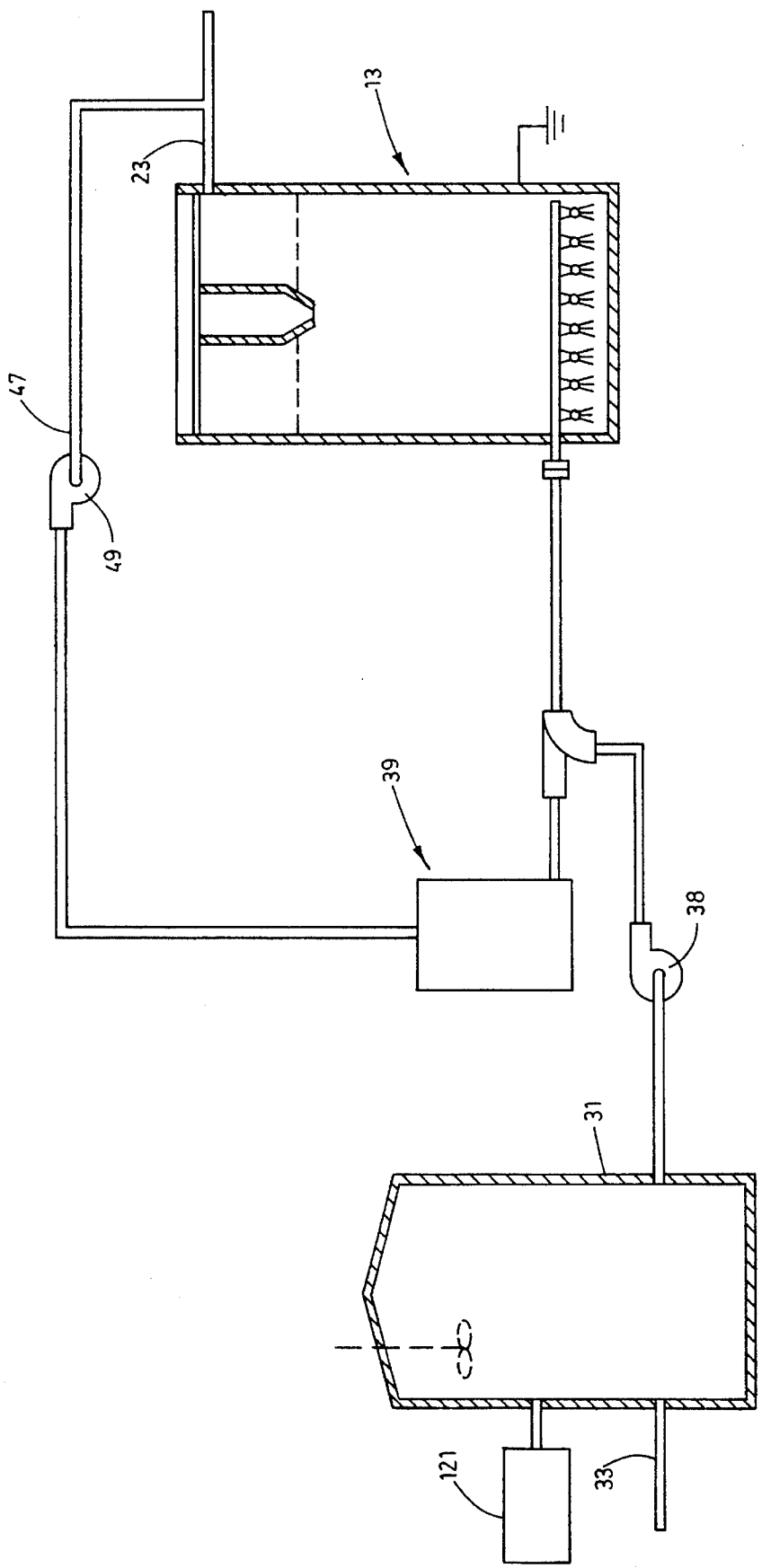

In another alternative embodiment of the invention, the supply 121 shown in FIG. 4 comprises oxygen or ozone, and a diffuser is provided such that extremely fine bubbles are introduced into the equalization surge tank 31. It has been found that much less stripping of volatile constituents occurs when oxygen or ozone is used instead of air to oxidize iron in the equalization surge tank 31. Other oxidants in gaseous form could also be employed in this embodiment of the invention.

In one embodiment of the invention, the reaction between the oxidant and the iron in the equalization surge tank 31 is catalyzed. For example, a uv/ozone oxidation can be employed.

Optionally, a mechanical stirring device 123 is provided for stirring liquid in the equalization surge tank 31 to speed oxidization of the iron in the tank 31. If such a stirring device is provided, it should not stir so violently as to cause stripping of volatile constituents in the equalization surge tank 31.

Also optionally, means 125 are provided for adjusting the pH of the liquid in the equalization surge tank 31 so that the speed of the oxidization reaction can be increased. For example, the pH of the liquid in the equalization surge tank 31 can be adjusted by introducing into the tank 31 a liquid that changes the pH of the liquid in the tank 31.

By supplying a liquid carrying an oxidant into an equalization surge tank, upstream of a fluid bed reactor, iron in wastewater is oxidized in the equalization surge tank without volatile constituents being stripped from the liquid in the equalization surge tank 31. Thus, fouling of the fluid bed reactor can be reduced without discharge of iron sludge and without the creation of dangerous gasses.

While a preferred embodiment of the invention has been described, various modifications are possible. Thus, the scope of the invention is to be limited only by the scope and spirit of the following claims.

We claim:

1. A method for treating water polluted with volatile constituents in a treatment facility, the treatment facility including a fluid bed reactor including a reactor tank containing a bed of particles which function as a carrier for growth of biological material, the reactor tank having an inlet and an outlet, the fluid bed reactor further including means for conducting liquid to be treated from the reactor tank inlet upwardly through the bed of particles at a rate conducive to fluidization of the bed of particles, the treatment facility including an equalization surge tank for housing liquid to be treated in the fluid bed reactor the equalization surge tank having an inlet, and an outlet connected to the reactor tank inlet, said method comprising the step of:

(a) oxidizing iron in the liquid in the equalization surge tank without stripping the volatile constituents.

2. A method as set forth in claim 1 wherein said iron oxidizing step comprises introducing oxygenated liquid into the equalization surge tank.

3. A method as set forth in claim 1 wherein said iron oxidizing step comprises introducing into the equalization surge tank a chemical which reacts with liquid in the equalization surge tank to produce oxygen dissolved in the liquid in the equalization surge tank.

4. A method as set forth in claim 3 wherein said iron oxidizing step comprises introducing hydrogen peroxide into said equalization surge tank.

5. A method as set forth in claim 2 wherein the treatment facility includes an oxygenator, separate from the fluid bed reactor and separate from the equalization surge tank, for dissolving oxygen into liquid, and the treatment facility includes a conduit extending from the oxygenator to the equalization surge tank, and wherein said iron oxidizing step further comprises:

supplying through the conduit the liquid containing dissolved oxygen.

6. A method as set forth in claim 5 and wherein the treatment facility includes a conduit from the oxygenator to the inlet of the fluid bed reactor.

7. A method as set forth in claim 16 and wherein the treatment facility includes a conduit from the outlet of the fluid bed reactor to the oxygenator for liquid flow from the fluid bed reactor to the oxygenator, such that a recycle stream is defined from the fluid bed reactor to the equalization surge tank via the oxygenator.

* * * * *